US008992842B2

(12) United States Patent
Gordon

(10) Patent No.: US 8,992,842 B2
(45) Date of Patent: Mar. 31, 2015

(54) SYSTEMS AND METHODS OF MAKING AMMONIA USING HYDROGEN AND NITROGEN GASES

(76) Inventor: Roger Gordon, Georgetown (CA)

( * ) Notice: Subject to any disclaimer, the term of this patent is extended or adjusted under 35 U.S.C. 154(b) by 104 days.

(21) Appl. No.: 13/607,910

(22) Filed: Sep. 10, 2012

(65) Prior Publication Data

US 2013/0272926 A1    Oct. 17, 2013

Related U.S. Application Data

(60) Provisional application No. 61/625,225, filed on Apr. 17, 2012.

(51) Int. Cl.
| | | |
|---|---|---|
| B01J 8/02 | (2006.01) | |
| C01C 1/04 | (2006.01) | |
| C25B 1/04 | (2006.01) | |
| C25B 15/08 | (2006.01) | |

(52) U.S. Cl.
CPC ............. *C01C 1/0417* (2013.01); *C01C 1/0405* (2013.01); *C25B 1/04* (2013.01); *C25B 15/08* (2013.01); *Y02E 60/366* (2013.01)
USPC ........... 422/148; 422/168; 422/169; 422/170; 422/171; 422/177; 422/180; 423/362; 423/213.2; 423/239.1; 423/352; 423/359; 60/276; 60/282

(58) Field of Classification Search
CPC ..................... B01J 8/02; C01C 1/04
USPC ................... 423/362, 213.2, 239.1, 352, 359; 422/148, 168, 169, 170, 171, 178, 177, 422/180; 60/276, 282
See application file for complete search history.

(56) References Cited

U.S. PATENT DOCUMENTS

| 1,452,594 A | * | 4/1923 | Georges | ........................ 422/148 |
| 1,544,373 A | * | 6/1925 | Georges | ........................ 423/360 |

(Continued)

FOREIGN PATENT DOCUMENTS

WO    2010128682    11/2010

OTHER PUBLICATIONS

Appl. M. "Ammonia", Ullmann'S Encyclopedia of Industrial Chemistry, Weinheim: Wiley-VCH Verlad Gmbh & Co. KGaA, 2006, pp. 11, 44, 62-83, 116-120; 174 pages.

(Continued)

*Primary Examiner* — Walter D Griffin
*Assistant Examiner* — Huy-Tram Nguyen
(74) *Attorney, Agent, or Firm* — Doherty IP Law Group LLC

(57) ABSTRACT

A system for producing ammonia includes sources of hydrogen and nitrogen gas, a hydrogen gas booster for producing produce pressurized hydrogen gas, a nitrogen gas booster for producing pressurized nitrogen gas, and a synthesis reactor that receives a mixture of the pressurized hydrogen and nitrogen gases. The synthesis reactor includes an inlet for receiving the pressurized gas mixture, a heating zone adjacent the inlet for heating the gas mixture, a catalyst zone downstream from the heating zone for catalyzing a reaction of the mixture to form ammonia and a by-product, and a cooling zone downstream from the catalyst zone for cooling the ammonia and the by-product. The system has a separator for separating the ammonia from the by-product, an ammonia storage tank for collecting the ammonia, and a recycle loop for re-circulating the by-product back to the synthesis reactor.

15 Claims, 6 Drawing Sheets

(56) References Cited

U.S. PATENT DOCUMENTS

| | | | |
|---|---|---|---|
| 2,467,861 A * | 4/1949 | Scharmann | 518/718 |
| 2,898,183 A | 8/1959 | Fauser | |
| 3,395,982 A | 8/1968 | Didycz | |
| 4,056,603 A * | 11/1977 | Bresler | 423/359 |
| 4,230,669 A * | 10/1980 | Eagle et al. | 422/148 |
| 4,298,588 A * | 11/1981 | Pinto | 423/359 |
| 4,479,925 A * | 10/1984 | Shires et al. | 423/359 |
| 4,582,911 A * | 4/1986 | Wachs et al. | 549/239 |
| 6,474,330 B1 | 11/2002 | Fleming et al. | |
| 7,708,966 B2 * | 5/2010 | Joshi | 423/213.2 |
| 2005/0019244 A1 * | 1/2005 | Spiegelman et al. | 423/352 |
| 2005/0034467 A1 * | 2/2005 | Varney | 62/178 |
| 2006/0284723 A1 * | 12/2006 | Ha et al. | 338/25 |
| 2009/0294576 A1 * | 12/2009 | LaForge | 244/30 |
| 2011/0243828 A1 * | 10/2011 | Gordon | 423/360 |

OTHER PUBLICATIONS

Written Opinion of the International Searching Authority for International application No. PCT/IB2013/000712, mailed Sep. 9, 2013, 9 pages.

International Search Report for International application No. PCT/IB2013/000712, mailed Sep. 9, 2013, 4 pages.

* cited by examiner

SYSTEMS AND METHODS OF MAKING AMMONIA USING HYDROGEN AND NITROGEN GASES

CROSS-REFERENCE TO RELATED APPLICATIONS

The present application claims the benefit of U.S. Provisional Application Ser. No. 61/625,225, filed Apr. 17, 2012, the disclosure of which is hereby incorporated by reference herein. The present application is related to U.S. Patent Application Publication No. 2011/0243828 entitled "Production of Ammonia from Air and Water," the disclosure of which is hereby incorporated by reference herein.

FIELD OF THE INVENTION

The present invention relates to generally production of ammonia and specifically production of ammonia from air and water.

BACKGROUND OF THE INVENTION

Typically, ammonia is produced in processes involving conversion of organic materials, such as natural gas (methane) or petroleum products. Such processes produce environmentally un-friendly materials.

SUMMARY OF THE INVENTION

In accordance with an aspect of the present invention, there is provided a system for producing ammonia from air and water, comprising a pressure-swing-adsorption (PSA) nitrogen generator for extracting nitrogen gas from air; a hydrogen generator comprising an electrolysis cell for producing hydrogen gas from water; a first piston-cylinder gas compressor connected to the nitrogen generator for receiving and compressing the nitrogen gas to produce pressurized nitrogen gas; a second piston-cylinder gas compressor connected to the hydrogen generator for receiving and compressing the hydrogen gas to produce pressurized hydrogen gas; a reactor connected to the first and second cylinder gas compressors to receive the pressurized nitrogen and hydrogen gases, the reactor comprising a third piston-cylinder gas compressor for further compressing a mixture of the pressurized nitrogen and hydrogen gases, a heater for heating the mixture in the third compressor, and a catalyst in the third compressor for catalyzing a reaction of nitrogen and hydrogen in the mixture to form ammonia; a gas separator for separating ammonia from gases received from the reactor, the gas separator comprising an inlet connected to the reactor for receiving the gases from the reactor, a first outlet connected to the reactor for circulating the gases back to the reactor, and a second outlet for outputting the ammonia. The first piston-cylinder gas compressor may be adapted to produce the pressurized nitrogen gas at a pressure of from about 60 to about 70 psi. The second piston-cylinder gas compressor may be adapted to produce the pressurized hydrogen gas at a pressure of from about 30 to about 40 psi. The third piston-cylinder gas compressor may be adapted to compress the mixture of the pressurized nitrogen and hydrogen gases to a pressure up to about 2,800 psi. The third piston-cylinder gas compressor may be adapted to operate at a temperature of above 500° C. and a pressure of above 2,000 psi. The third piston-cylinder gas compressor may be adapted to operate at a temperature from about 450 to about 500° C. and a pressure of from about 2,000 to about 3000 psi. The catalyst may be selected from ruthenium, carbon steel, iron, titanium, stelite, and platinum, or a mixture of two or more thereof. The catalyst may be selected from ruthenium, iron, and titanium, or a mixture of two or more thereof. The system may comprise a catalyst bed containing the catalyst.

In accordance with another aspect of the present invention, there is provided a process for producing ammonia from air and water, comprising producing nitrogen gas from air by pressure-swing-adsorption; producing hydrogen gas by electrolysis of water; compressing the nitrogen gas in a first cylinder to produce pressurized nitrogen gas; compressing the hydrogen gas in a second cylinder to produce pressurized hydrogen gas; compressing a mixture of the pressurized nitrogen and hydrogen gases in a third cylinder; heating the compressed mixture in the presence of a catalyst to react nitrogen and hydrogen to form ammonia; and extracting the ammonia from the mixture. The pressurized nitrogen gas may have a pressure of from about 60 to about 70 psi. The pressurized hydrogen gas may have a pressure of from about 30 to about 40 psi. The mixture of the pressurized nitrogen and hydrogen gases may be compressed to a pressure up to about 2,800 psi. The catalyst may be selected from ruthenium, carbon steel, iron, titanium, stelite, and platinum, or a mixture of two or more thereof. The catalyst may be selected from ruthenium, iron, and titanium, or a mixture of two or more thereof. The pressurized nitrogen and hydrogen gases may be reacted at a temperature from about 450 to about 500° C. and a pressure of about 2,000 to about 3000 psi, or at a temperature of above 500° C. and a pressure of above 2,000 psi. The volume ratio of hydrogen to nitrogen in the mixture of the pressurized nitrogen and hydrogen gases may be about 3:1.

In one embodiment, a system for producing ammonia preferably includes a source of hydrogen gas, a source of nitrogen gas, a hydrogen gas booster connected to the source of hydrogen gas for receiving and pressurizing the hydrogen gas, and a nitrogen gas booster connected to the source of nitrogen gas for receiving and pressurizing the nitrogen gas.

In one embodiment, the system includes a first storage tank containing the source of hydrogen gas, and a second storage tank containing the source of nitrogen gas.

In one embodiment, the hydrogen gas is introduced into the hydrogen gas booster at 150 psig and a feedrate of 1 standard liter per minute (SLPM), and the nitrogen gas is introduced into the nitrogen gas booster at 150 psig and a feedrate of 0.33 SLPM.

In one embodiment, the hydrogen gas booster preferably increases the pressure of the hydrogen gas from about 50 psig to about 2,500-3,000 psig. The hydrogen gas booster desirably uses compressed air at about 150 psig for driving the hydrogen gas booster.

In one embodiment, the nitrogen gas booster preferably increases the pressure of the nitrogen gas from about 50 psig to about 2,500-3,000 psig. The nitrogen gas booster desirably uses compressed air at about 150 psig for driving the nitrogen gas booster.

The system desirably includes a hydrogen plenum chamber downstream from the hydrogen gas booster for storing the pressurized hydrogen gas, a nitrogen plenum chamber downstream from the nitrogen gas booster for storing the pressurized nitrogen gas, and a synthesis reactor connected to the hydrogen and nitrogen plenum chambers.

In one embodiment, the hydrogen plenum chamber desirably has a relief valve for maintaining the pressurized hydrogen gas stored therein at about 2,600 psig, and the nitrogen plenum desirably has a relief valve for maintaining the pressurized nitrogen gas stored therein at about 2,600 psig.

In one embodiment, the synthesis reactor preferably has an inlet for receiving a mixture of the pressurized hydrogen and nitrogen gases, a heating zone downstream from the inlet for heating the mixture of the hydrogen and nitrogen gases, a catalyst zone downstream from the heating zone for catalyzing a reaction of the mixture of the hydrogen and nitrogen gases to form ammonia and a by-product, and a cooling zone downstream from the catalyst zone for cooling the ammonia and the by-product.

In one embodiment, the heating zone of the synthesis reactor makes up about the first 12 inches of the ammonia synthesis reactor. The heating zone of the synthesis reactor is desirably covered with an insulating material.

The synthesis reactor may include a thermowell disposed inside the metal tube, the thermowell including thermowell tubing and a thermocouple placed inside the thermowell tubing for measuring temperatures inside the synthesis reactor.

In one embodiment, the synthesis reactor has a catalyst bed containing a catalyst material for reacting the pressurized hydrogen and nitrogen gases to produce ammonia. The catalyst material may be hermatite, ruthenium, carbon steel iron, titanium, stelite, and platinum, or a combination of two or more thereof.

In one embodiment, the synthesis reactor includes an outlet and the system further includes cooling coils in communication with the outlet of the synthesis reactor for cooling a stream of the ammonia gas, and hydrogen and nitrogen gases dispensed from the outlet of the synthesis reactor. The cooling coils desirably condense the ammonia gas into liquid ammonia for storage in an ammonia storage tank.

In one embodiment, the synthesis reactor includes a metal tube having a diameter of about 0.50 inches and a wall thickness of about 0.065 inches.

In one embodiment, the system desirably includes a separator for separating the ammonia from the by-product, the separator having an inlet connected to the synthesis reactor for receiving the ammonia and the by-product, a first outlet connected to an ammonia storage tank for collecting the ammonia, and a second outlet connected to a recycle loop for re-circulating the by-product back to the inlet of the synthesis reactor.

In one embodiment, the system desirably includes a recycle loop extending between the outlet of the reactor and the inlet of the reactor for returning the by-product back to the synthesis reactor.

Other aspects and features of the present invention will become apparent to those of ordinary skill in the art upon review of the following description of specific embodiments of the invention in conjunction with the accompanying figures.

DETAILED DESCRIPTION

Figure 1:
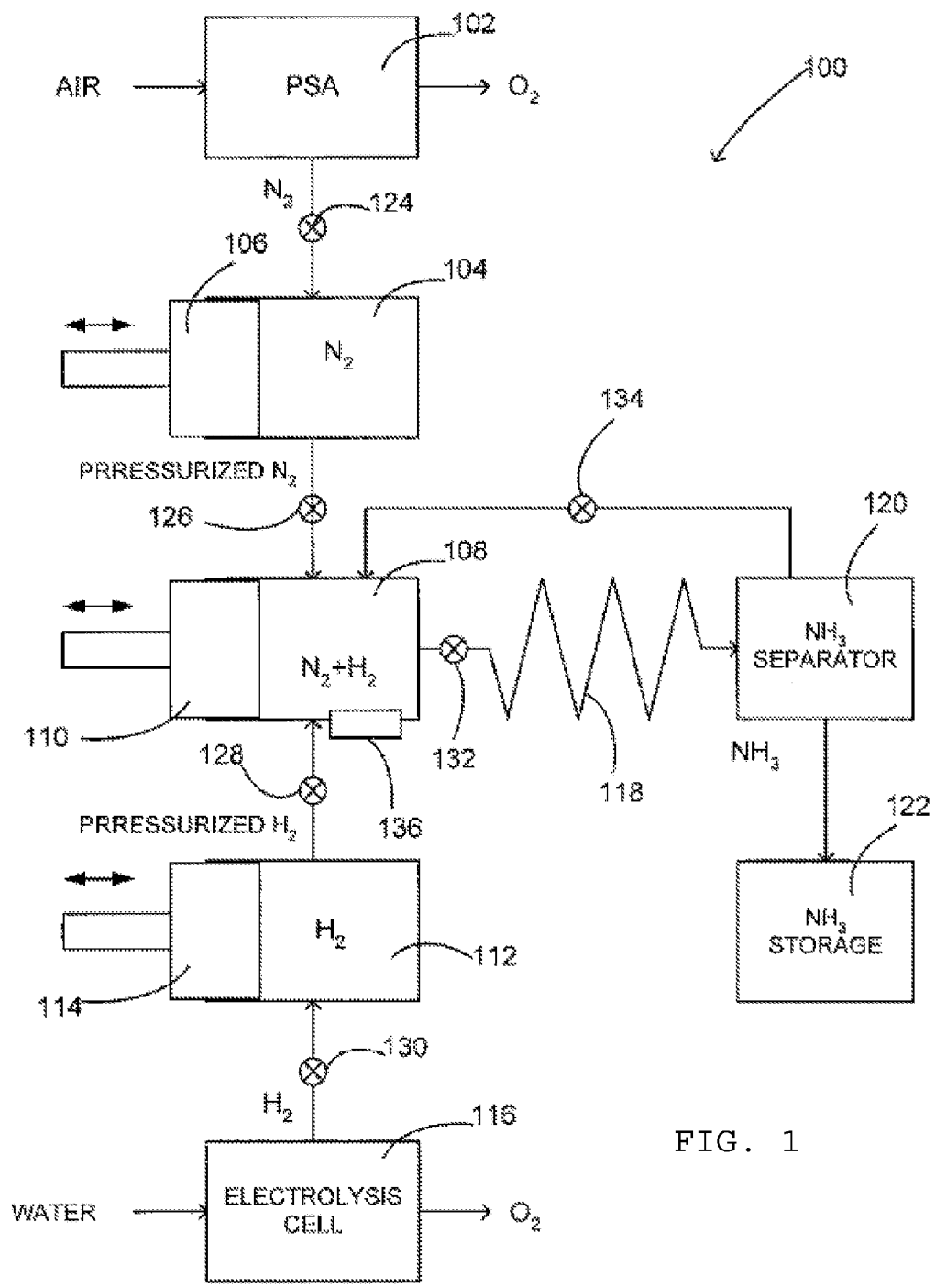
FIG. 1 shows an ammonia production system, in accordance with one embodiment of the present invention.

FIG. 1 schematically depicts an ammonia production system 100, exemplary of one embodiment of the present invention. As will become apparent, in different applications, system 100 may be implemented on different scales. For example, it may form a part of a production plant (not shown) or the fuel source in an automobile (not shown).

In one embodiment, the ammonia production system 100 includes a pressure-swing-adsorption (PSA) nitrogen generator 102, a piston-cylinder compressor 104 with a compression piston 106, a piston-cylinder compressor 108 with a compression piston 110, a piston-cylinder compressor 112 with a compression piston 114, an electrolysis cell 116, a coiled equilibrium loop 118, a separator 120, and a storage tank 122, which are connected through valves 124, 126, 128, 130, 132, 133, 134, and 135 as illustrated in FIG. 1.

Briefly, system 100 converts air to ammonia ($NH_3$) by extracting nitrogen from air and generating hydrogen from water, and then reacting nitrogen and hydrogen under high pressure to form ammonia. The main by-product of the process is oxygen. Consequently, the production process produces no carbonaceous pollutants.

System 100 has two input legs. One leg includes PSA nitrogen generator 102 and compressor 104, which are connected to each other to produce pressurized nitrogen from air. The other leg includes electrolysis cell 116 and compressor 112, which are connected to each other to produce pressurized hydrogen from water.

The pressurized nitrogen and hydrogen gases are mixed, further pressurized, and heated in compressor 108, which contains a catalyst bed 136. The heated, pressurized gases react in the presence of the catalyst to produce ammonia. Both reacted and unreacted gases are then fed into loop 118, where additional ammonia is produced. The ammonia product is separated from other gases in Separator 120 and sent to Storage 122.

More specifically, in the first input leg, PSA nitrogen generator 102 takes air as input and outputs oxygen and nitrogen.

PSA nitrogen generator 102 utilizes the fact that oxygen and nitrogen gases in the air can be adsorbed on solid surfaces of an adsorbent (not separately shown) under pressure. The higher the pressure, the more gases adsorbed. When the pressure is later reduced, the adsorbed gas can be released (desorbed). Further, a given adsorbent can attract one gas (such as nitrogen) more strongly than another gas (such as oxygen) under the same pressure. Thus, in one embodiment, air may be pressurized in a vessel (not separately shown) containing an adsorbent selected to preferentially attract nitrogen in PSA nitrogen generator 102, nitrogen will be preferentially adsorbed. After the remaining air is removed, and the pressure is lowered in the vessel, the adsorbed nitrogen can be released and collected as a gas. The released nitrogen gas can then be fed to compressor 104. As can be understood, to save energy and increase efficiency, multiple pressure vessels may be used in PSA nitrogen generator 102.

PSA nitrogen generator 102 may be constructed based on techniques known to those skilled in the art, and may be obtained from commercial sources. For example, Model P2 provided by OGSI (Oxygen Generating Systems International) may be used as the PSA nitrogen generator. According to OGSI, the adsorbent used in Model P2 includes alumina beads.

The nitrogen output from PSA nitrogen generator 102 should be sufficient to support the desired ammonia output. In one embodiment, the output rate of nitrogen from generator 102 may be about 1 ft$^3$/min at atmospheric pressure.

Compressor 104 compresses the nitrogen gas by reducing the gas volume using mechanical force, as can be understood by those skilled in the art. Compression piston 106 may be driven by a suitable motor or shaft servo (not shown). The motor or shaft servo may be hydraulically or electrically powered. The pressure of output gas from compressor 104 may be from about 60 to about 70 psi. In one embodiment, the cylinder of compressor 104 may be made of a carbon shell tube, with an internal dimension of about 3 inch in diameter and about 24 inch in length.

At the end of the first leg, the pressurized nitrogen gas is fed to compressor 108.

In the second input leg, hydrogen is produced from water in electrolysis cell 116, utilizing the known electrolysis reactions that produce hydrogen from water, through the decomposition reaction: $2H_2O \leftarrow\rightarrow 2H_2 + O_2$.

Electrolysis cell 116 may included a water electrolysis hydrogen generator available from commercial suppliers, such as Claind™, Hgen™, or Electrolyser™. Electrolysis cell 116 may include a stainless electrolyser and a stainless shell. Electrical potentials may be applied to the anode and cathode of the cell to establish an electric current through the cell. A DC (direct current) voltage from 24 V to 80 volt may be applied between the anode and cathode.

It is not necessary to heat the cell during production as the electrolysis reaction may produce enough heat to maintain a sufficient reaction temperature. Additional heating may also cause the electrolyser to overheat.

Compressor 112 operates in a similar manner as compressor 104 does. The pressure of output gas from compressor 112 may be from about 30 to about 40 psi.

In one embodiment, the cylinder of compressor 112 may be made of a carbon shell tube, with an internal dimension of about 3 inch in diameter and about 24 inch in length.

In one embodiment, the cylinder of compressor 108 may be made of a carbon steel tube, with an internal dimension of about 3 inch in diameter and about 36 inch in length. Compressor 108 also serves as a mixer, and has a first inlet for receiving pressurized nitrogen gas from compressor 104, a second inlet for receiving pressurized hydrogen gas from compressor 112, and a third inlet for receiving recycled gases from the return line of loop 118 through valve 134. Compressor 108 also has an outlet for feeding pressurized mixture of hydrogen, nitrogen and ammonia gases to loop 118.

Catalyst bed 136 contains a suitable catalyst such as ruthenium, titanium, iron, mixtures of titanium and iron, or mixtures of ruthenium and iron. Catalyst bed 136 may be provided in any suitable form. In one embodiment, catalyst bed 136 may include a pipe with a removable cap (not separately shown). Catalyst bed 136 may be configured and positioned so that it is not obstructing the gas flow.

It is not necessary to compress the gas mixture in compressor 108 with a mechanical force provided by piston 110 to reach the reaction pressure. The partially compressed gas may be further compressed by heating to reach the reaction pressure. The pressure applied by piston 110 may be up to about 2,800 psi.

Compressor 108 may also be pre-heated before taking any input. Heating may be effected in any suitable manner, such as using propane as fuel or using an electric heating element (not shown). A thermostat (not shown) and a temperature control system (not shown) may be provided to control the heating operation.

In one embodiment, the reaction temperature in compressor 108 may be above 500° C., and the reaction pressure in compressor 108 may be above 2,000 psi. The operating pressure in compressor 108 may be from about 2,000 to about 3,000 psi. The reaction temperature and pressure, however, can vary and may be different in different embodiments. The reaction temperature and pressure may be selected by those skilled in the art based on the desired reaction rate and yield, and other factors in a particular embodiment or application.

Hydrogen and nitrogen gases may be fed to compressor 108 at a ratio selected to optimize reaction efficiency. For example, the volume ratio of hydrogen gas to nitrogen gas fed to compressor 108 may be about 3:1. The gases may be fed to compressor 108 at a pressure of about 20 psi.

Loop 118 may include a coiled pipe made from carbon steel tube or stainless tube. In some embodiments, carbon steel may be used, as the iron content in carbon steel may have some catalytic effect on the ammonia producing reactions. Loop 118 may be configured and adapted to withstand input gas pressure of about 2500 psi and input gas temperature of about 450 to about 475° C. The output from loop 118 at valve may have a slightly lower temperature.

In loop 118, the gases are allowed to further react. While the gases in loop 118 are reacting to produce further ammonia, valve 132 may be closed to allow further gas input, compression, heating, and reaction to occur in compressor 108. Thus, ammonia may be more efficiently produced. Loop 118 may be made of stainless steel or carbon steel. Carbon steel may be advantageous as ammonia production is expected to be facilitated by the presence of carbon steel on the surface of a carbon steel material. For this and other reasons, the fittings downstream of compressor 108 may be made of stainless or cast iron. It is expected that copper and brass may degrade when exposed to ammonia, and thus should be avoided.

Valves 132 and 133 may be normally closed. For example, valve 132 may be opened and valve 133 may be closed when feeding gas from compressor 108 into loop 118. Feeding may be effected by pushing piston 110 inward. Feeding may also be effected by establishing a pressure difference between the gas in compressor 108 and the gas in loop 118 so that gas will flow from compressor 108 towards loop 118. Valve 132 may be closed and valve 133 may be opened when withdrawing gas from loop 118 into separator 120. Gas flow may be established by pressure differential.

Separator 120 may include a stainless steel vessel with a top outlet connected to valve 134 and a bottom outlet connected to valve 135. Ammonia may be separated from other gases based on the fact that under pressure ammonia is in the form of a liquid and is heavier than the other gas components. Thus, liquid ammonia may be collected through the bottom outlet connected to valve 135 and the lighter gas components may be extracted from separator 120 through the top outlet connected to valve 134.

Separator 120 may be configured for batch separation or continuous separation. A computer (not shown) may be provided to control the continuous separation operation.

In use, system 100 may be operated as follows.

Operation of $N_2$-Input Leg

PSA nitrogen generator 102 may be operated in a batch mode. Valve 124 is closed as $N_2$ is being extracted from air. Valve 126 is opened and piston 106 is pushed in to expel gas from compressor 104 into compressor 108. When loading $N_2$ into compressor 108, valves 128, 132 and 134 are also closed.

When a batch of $N_2$ gas has been extracted and is ready for use, valve 126 is closed, valve 124 is opened, and piston 106 is pulled out to draw $N_2$ gas from PSA nitrogen generator 102 into compressor 104.

Next, valve 124 is closed and valve 126 is opened, and piston 106 is pushed in to press pressurized $N_2$ gas into compressor 108. To prevent significant back flow, piston 106 may be pushed in partially or fully before opening valve 126, so that the pressure in compressor 104 is substantially higher than the pressure in compressor 108. At this time, piston 110 may be pulled out completely to provide the maximum gas volume in compressor 108.

Valve 126 is next closed. The next batch of $N_2$ gas can then be loaded into compressor 104 by repeating the above procedure.

Operation of $H_2$-Input Leg

Electrolysis cell 116 may be operated in a batch or continuous mode to produce $H_2$ gas.

The $H_2$ gas produced by electrolysis cell 116 may be fed to compressor 112 in batch mode as follows.

Valve 128 is opened, valve 130 is closed, and piston 114 is pushed in to expel gas from compressor 112 into compressor 108. When loading $H_2$ into compressor 108, valves 126, 132 and 134 are closed.

Next, valve 128 is closed, valve 130 is opened, and piston 114 is pulled out to draw $H_2$ gas from Electrolysis cell 116 into compressor 112.

Valve 130 is then closed and valve 128 is opened, and piston 114 is pushed in to press pressurized $H_2$ gas into compressor 108. To prevent significant back flow, piston 114 may be pushed in partially or fully before opening valve 128, so that the pressure in compressor 112 is substantially higher than the pressure in compressor 108. Again, when feeding $H_2$ gas, piston 110 may be pulled out completely to provide the maximum gas volume in compressor 108.

Valve 128 is next closed. The next batch of $H_2$ gas can then be loaded into compressor 112 by repeating the above procedure.

$N_2$ and $H_2$ gases may be fed into compressor 108 simultaneously or at different times.

Operation of Reaction Components.

After a batch of desired amounts of $H_2$ and $N_2$ gases is loaded into compressor 108, valves 126 and 128 are closed and remain in the closed state until next loading. The volume ratio of $H_2$ to $N_2$ in compressor 108 may be about 3:1.

With valves 132 and 134 still in the closed state, piston 110 is pushed in to compress the gas mixture in compressor 108, such as to a pressure of 30 to 40 psi. To accelerate reaction, compressor 108 may be heated, such as to a temperature of from about 450 to about 500° C. Upon heating, the pressure in the compressor may also increase. The operating pressure in compressor 108 may reach 2,000 to 3000 psi. At the operating temperature and pressure, and in the presence of the catalyst, ammonia is produced according to reaction (2): $N_2(g) + 3H_2(g) \rightleftharpoons 2NH_3(g)$ Reaction (2) is exothermic ($\Delta H = -92.4$ kJ/mol at room temperature) and the heat generated by the reaction may be conveniently used to heat the reaction system. Thus, after initial heating, it is not necessary to heat the system with an external heat source.

During reaction, the temperature in compressor 108 may be controlled. For example, a cooling coil (not shown) may be provided around compressor 108 to remove heat generated by the reaction. The removed heat energy may be provided to another component, such as the unit for generating hydrogen with electrolysis cell 116.

A suitable amount of catalyst may be placed in catalyst bed 136. For example, about 10 to about 40 g of catalyst may be placed in catalyst bed 136. In different embodiments, ruthenium, carbon steel, iron, titanium, stelite, platinum, or a mixture thereof may be used as the catalyst.

Increasing reaction pressure will shift the equilibrium position to the right hand side of Reaction (2), resulting in a higher yield of ammonia. Thus, the reaction pressure in compressor 108 and loop 118 should be maintained at above about 2,000 psi, such as from about 2,000 to about 3,000 psi. Further increase in pressure may further increase yield, but may also increase the equipment and operation costs.

While reducing temperature can shift the equilibrium position to the right hand side in Reaction (2), resulting in increased yield, it also reduces reaction rate. Therefore, to optimize the overall rate of production and yield, the reaction temperature in compressor 108 and loop 118 should be selected to balance these two effects. In one embodiment, the balance may be achieved at a reaction temperature in the range of about 450 to about 500° C.

While such a high temperature is desirable to provide a high reaction rate, and for the catalyst to be effective, the equilibrium in reaction (2) is shifted to the right hand side of reaction (2) at a higher temperature. Thus, the conversion rate on each pass at the operating temperature and pressure may not be very high. To address this issue, the un-reacted gases may be recycled through compressor 108, via loop 118.

The un-reacted gases may also react in loop 118, thus improving the overall yield.

To this end, after a selected period of reaction at the selected temperature and pressure, such as about one second, valve 132 is opened to transport the reaction mixture with ammonia gas produced into loop 118. When feeding gas into loop 118, valve 133 is closed. The pressure in loop 118 may be reduced to below the pressure in compressor 108 prior to opening valve 132.

After the pressures in compressor 108 and loop 118 reach equilibrium, valve 132 may be closed.

Operation of Output Components.

The reaction product gas (ammonia) and unreacted gases are withdrawn from loop 118 by opening valve 133, and fed into separator 120, with valve 135 closed. The gas may flow due to pressure differential.

Ammonia gas is fed to storage 122 through valve 135.

Un-reacted gases may be fed back to compressor 108 through valve 134, such as by opening valve 134 and pulling out piston 110. Recycled gasses may be mixed with new input hydrogen and nitrogen gases.

The above procedure may be repeated to produce additional batches of ammonia gas.

In one embodiment, the power consumption at different stages may be as listed in Table I, with the input gas volume at compressor 108 for each batch being 1-2 L of $N_2$ and 2-6 L of $H_2$.

TABLE I

| Energy Input | |
|---|---|
| Unit | Power (kw) |
| 102 | 1 |
| 116 | 7 |
| 106/110/114 | 5 |

Figure 2:
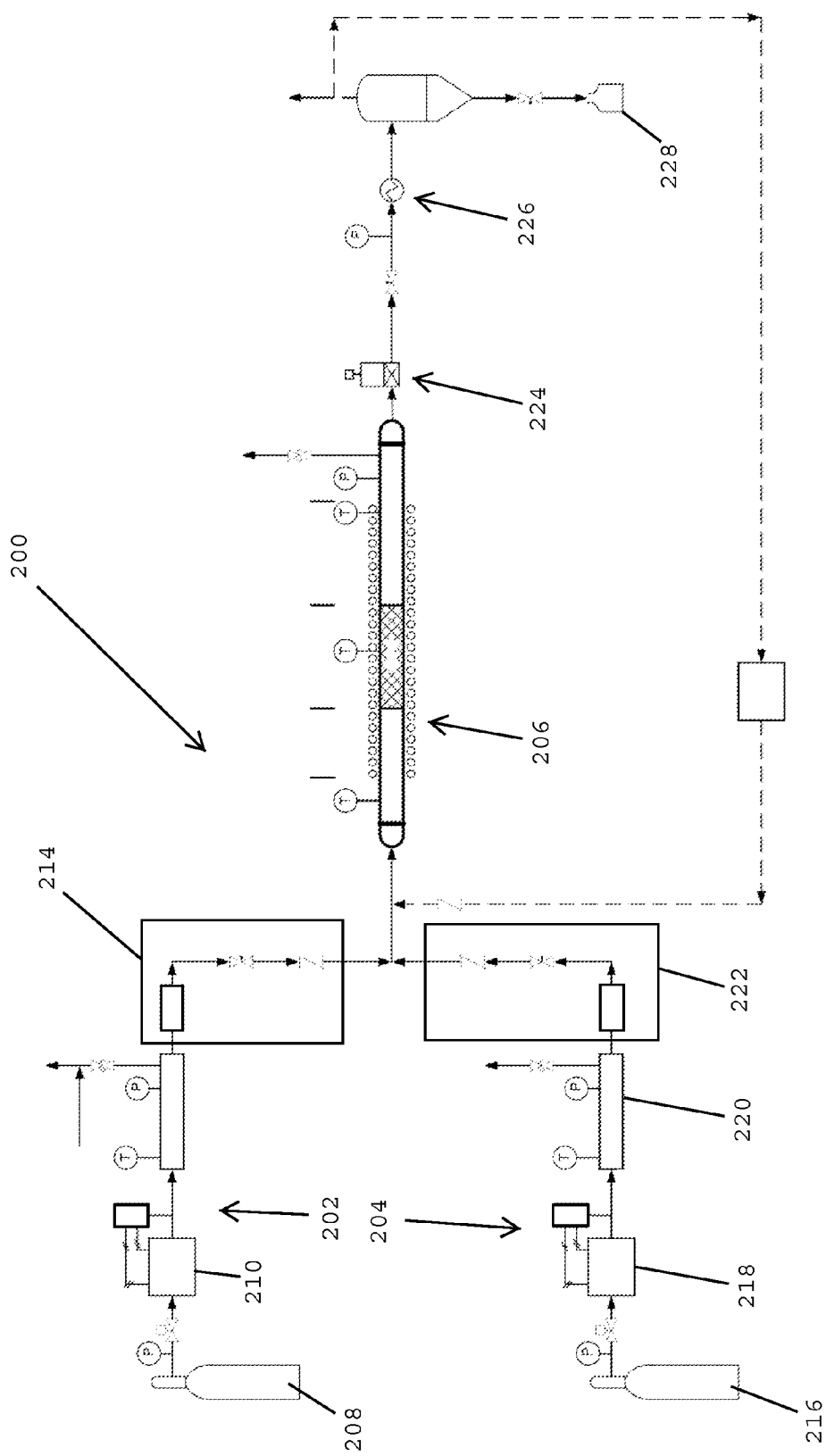
FIG. 2 shows an ammonia production system, in accordance with still another embodiment of the present invention.

Referring to FIG. 2, in one embodiment, an ammonia production system 200 preferably includes a first leg 202 and a second leg 204 that supply a synthesis reactor 206. In one embodiment, the first leg 202 supplies pressurized hydrogen gas to the synthesis reactor 206, and the second leg 204 supplies nitrogen gas to the synthesis reactor 206.

In one embodiment, the first leg 202 of the ammonia production system desirably includes a hydrogen gas cylinder 208, a hydrogen gas booster 210 downstream from the hydrogen gas cylinder, a hydrogen plenum chamber 212 downstream from the hydrogen gas booster, and a hydrogen gas flow control system 214 for controlling the flow of the pressurized hydrogen gas to the synthesis reactor 206.

In one embodiment, the second leg 202 of the ammonia production system desirably includes a nitrogen gas cylinder 216, a nitrogen gas booster 218 located downstream from the nitrogen gas cylinder, a nitrogen plenum chamber 220 downstream from the nitrogen gas booster, and a nitrogen gas flow control system 222 for controlling the flow of the pressurized nitrogen to the synthesis reactor 206.

In one embodiment, the ammonia production system 200 desirably includes the ammonia synthesis reactor 206 having heating and cooling capabilities, a back pressure controller 224, a heat exchanger 226, and n ammonia collection tank 228. In one embodiment, hydrogen gas and nitrogen gas are both compressed and fed into the synthesis reactor. The synthesis reactor contains a catalyst that preferably requires preheating so the temperature of the gases reaches about 200° C. The product of the ammonia gas and un-reacted gases is desirably cooled and depressurized to atmospheric conditions using the back pressure control regulating valve 224. The product gas stream is desirably chilled to condense the ammonia for collection.

Figure 3A:
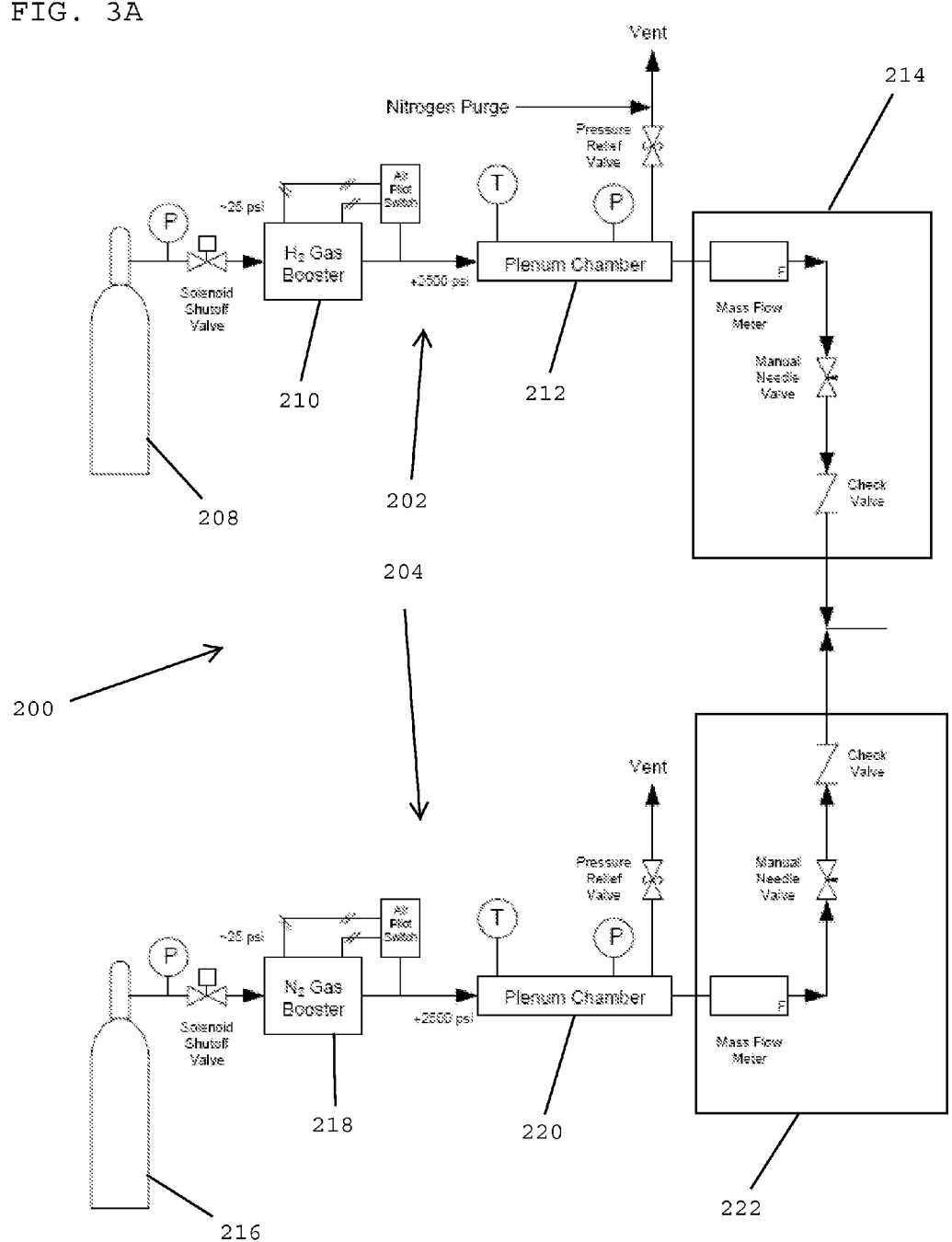
FIG. 3A shows a magnified view of a first part of the ammonia production system of FIG. 2.

Referring to FIG. 3A, in one embodiment, the hydrogen and nitrogen gasses are supplied by the compressed hydrogen gas cylinder 208 and the nitrogen gas cylinder 216. The hydrogen gas cylinder 208 is connected with the hydrogen gas booster 210, and the nitrogen gas cylinder 216 is connected with the nitrogen gas booster 218. In one embodiment, the gases are desirably metered to the respective gas boosters 210, 218 at about 50 psig using standard low pressure gas flow meters. In one embodiment, the hydrogen gas feed rate is about one (1) SLPM while the nitrogen gas feed rate is about 0.33 SLPM. In one embodiment, the system preferably includes a safety shut off using normally closed solenoid valves to turn off the gas feed stream, if necessary.

In one embodiment, the hydrogen gas booster 210 uses compressed air at 150 psig as a driving force to compress the hydrogen gas from 50 psig to 2600 psig. The compressed hydrogen gas is maintained in the hydrogen gas plenum chamber 212 at 2600 psig through the use of air pilot switches.

In one embodiment, the nitrogen gas booster 218 uses compressed air at 150 psig as a driving force to compress the nitrogen gas from 50 psig to 2600 psig. The compressed nitrogen gas is maintained in the nitrogen gas plenum chamber 220 at 2600 psig through the use of air pilot switches.

In one embodiment, the plenum chambers 212, 220 are made of stainless steel cylinders and serve as the feed gas storage vessels for storing the feed gases at 2600 psig.

In one embodiment, the flow of hydrogen gas through the first leg 202 is controlled manually using the hydrogen gas flow control system 214. The hydrogen gas flow control system may include a needle valve combined with mass flow meters to control the hydrogen gas flows.

In one embodiment, the flow of nitrogen gas through the second leg 204 is controlled manually using the nitrogen gas flow control system 222. The nitrogen gas flow control system may include a needle valve combined with mass flow meters to control the nitrogen gas flows.

Figure 3B:
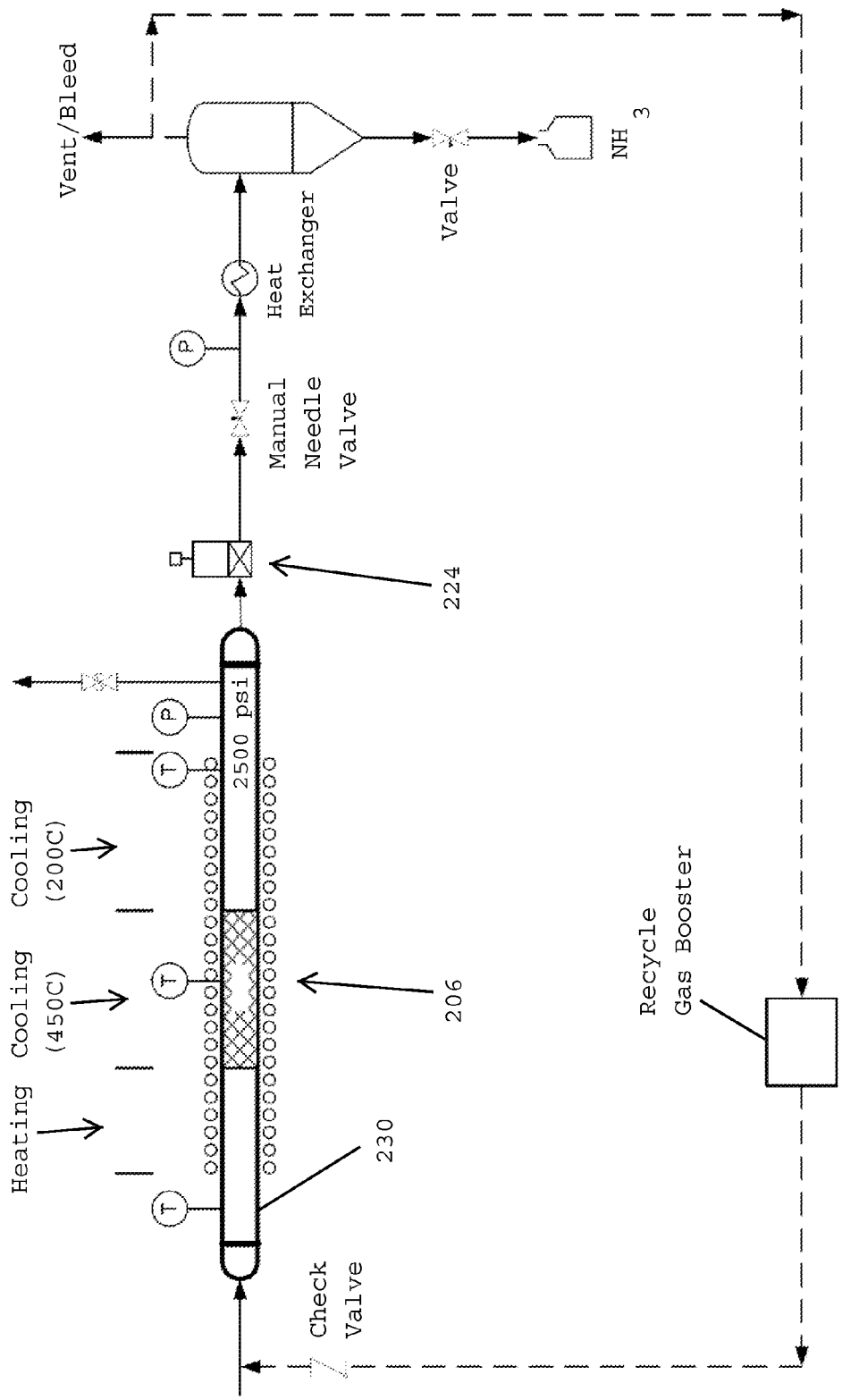
FIG. 3B shows a magnified view of a second part of the ammonia production system of FIG. 2 including a synthesis reactor.
Figure 4:
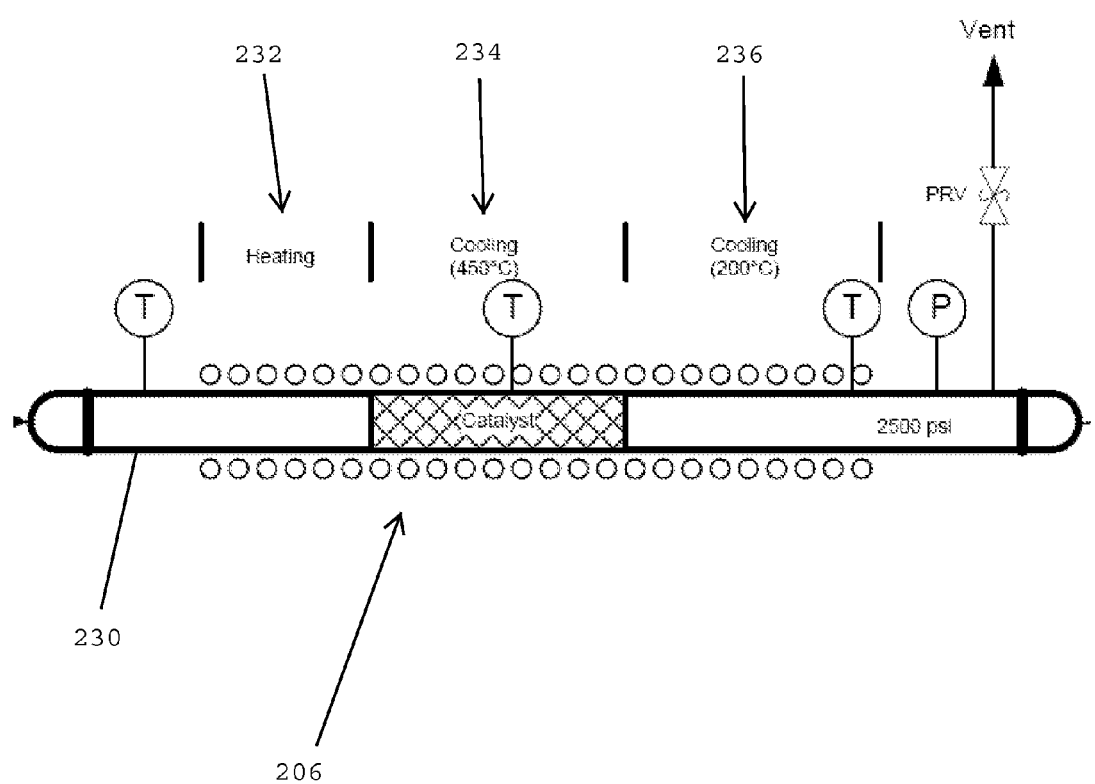
FIG. 4 shows a magnified view of the synthesis reactor of FIG. 3B.

Referring to FIGS. 3B and 4, in one embodiment, the ammonia synthesis reactor 206 preferably includes a seamless, stainless steel tube 230. In one embodiment, the tube 230 has a diameter of about 0.50" and a wall thickness of about 0.065". In one embodiment, the ammonia synthesis reactor 206 includes a thermowell disposed inside the reactor. In one embodiment, the thermowell is made of stainless steel ⅛" tubing which ¹⁄₃₂" thermocouples will be placed inside for temperature measurement. The ammonia synthesis reactor 206 preferably has a heating zone 232 for heating the hydrogen and nitrogen gasses, a reaction zone 234 including a catalyst for producing the ammonia gas, and a cooling zone 236 for cooling the produced ammonia gas and any by-product. In one embodiment, the heating zone 232, which may be about the first 12" of the reactor, is wrapped with ceramic heating tape connected to a heater controller. The reaction zone 234 preferably includes the catalyst, such as hematite.

Referring to FIG. 3B, the ammonia production system preferably includes the back pressure controller 224 whereby the reactor pressure is controlled by a back pressure regulating-relief valve. The relief valve is set to release reactor pressure at 2500 psig to 0 psig.

In one embodiment, the system includes the refrigerating cooling coil 226 in which refrigerating cooling (e.g. at 0°) will be employed to cool the reactor outlet stream ($H_2$, $N_2$, and $NH_3$). The ammonia gas is condensed upon cooling.

In one embodiment, the system preferably includes the ammonia collection tank 228, which is desirably a small stainless steel chamber used to collect the ammonia product from the synthesis reactor 206 as a liquid product.

In one embodiment, the system 200 preferably includes a recycle loop 230 that returns any by-product from the ammonia production system back to the inlet of the synthesis reactor 206 for running through another cycle through the reactor 206.

Figure 5:
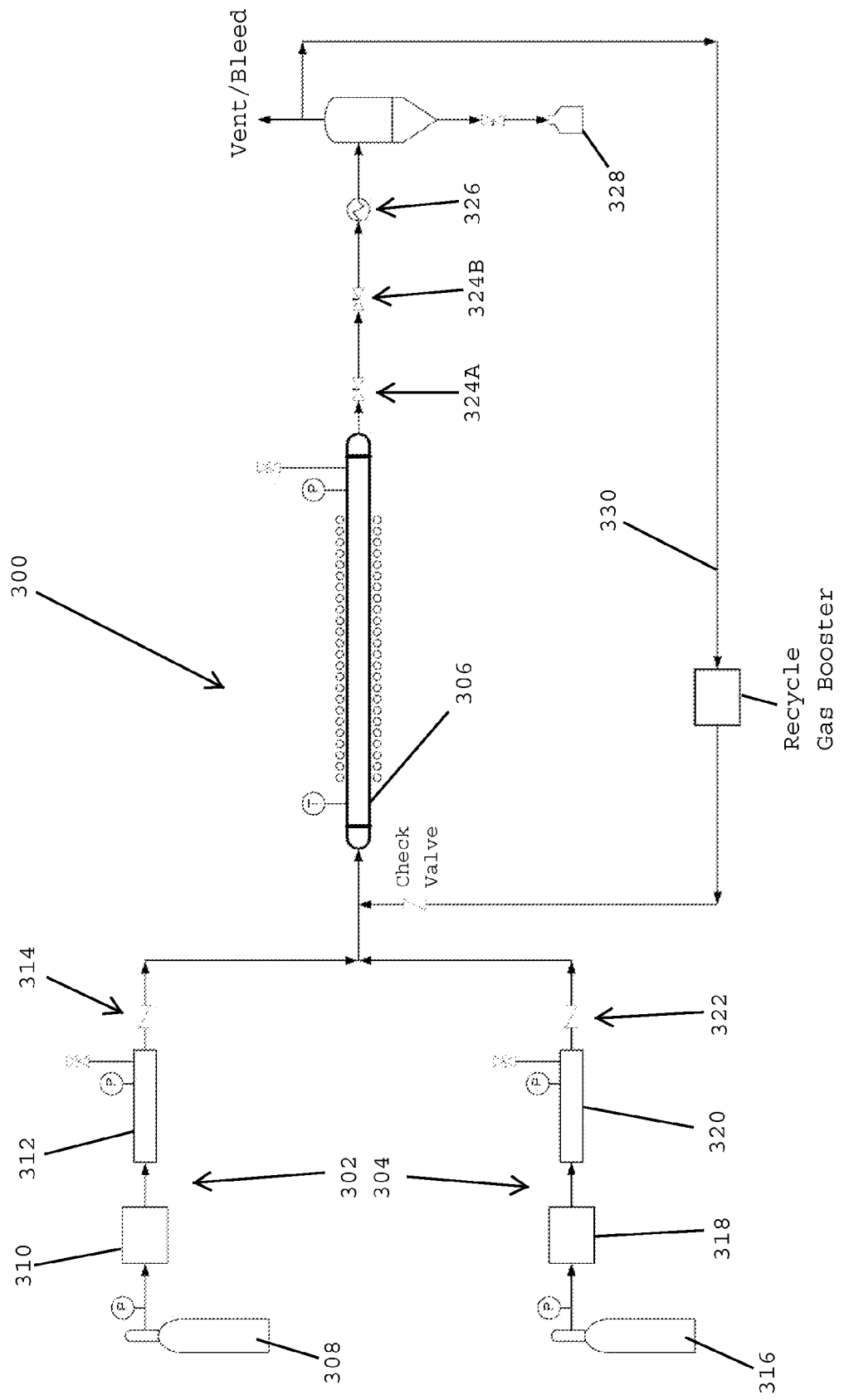
FIG. 5 shows an ammonia production system, in accordance with another embodiment of the present invention.

Referring to FIG. 5, in one embodiment, an ammonia production system 300 preferably includes a first leg 302 and a second leg 304 that supply a synthesis reactor 306. In one embodiment, the first leg 302 supplies pressurized hydrogen gas to the synthesis reactor 306, and the second leg 304 supplies nitrogen gas to the synthesis reactor 306.

In one embodiment, the first leg 302 of the ammonia production system desirably includes a hydrogen gas cylinder 308, a hydrogen gas booster 310 downstream from the hydrogen gas cylinder, a hydrogen plenum chamber 312 downstream from the hydrogen gas booster, and a check valve 314 for controlling the flow of the pressurized hydrogen gas to the synthesis reactor 306.

In one embodiment, the second leg 302 of the ammonia production system desirably includes a nitrogen gas cylinder 316, a nitrogen gas booster 318 located downstream from the nitrogen gas cylinder, a nitrogen plenum chamber 320 downstream from the nitrogen gas booster, and a check valve 322 for controlling the flow of the pressurized nitrogen to the synthesis reactor 306.

In one embodiment, the ammonia production system 200 desirably includes the ammonia synthesis reactor 206 having heating and cooling capabilities, actuated valves 324A, 324B, a heat exchanger 326, and an ammonia collection tank 328. In one embodiment, hydrogen gas and nitrogen gas are both compressed and fed into the synthesis reactor. The synthesis reactor contains a catalyst that preferably requires preheating so the temperature of the gases reaches about 200° C. The product of the ammonia gas and un-reacted gases is desirably cooled and depressurized to atmospheric conditions using the actuated valves 324A, 324B. The product gas stream is desirably chilled to condense the ammonia for collection.

In one embodiment, the ammonia production system 300 preferably includes a recycle loop 330 that returns any by-product from the ammonia production system back to the inlet of the synthesis reactor 306 for running through the synthesis reactor 306 in another cycle.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A system for producing ammonia comprising:
   a source of hydrogen gas;
   a source of nitrogen gas;
   a hydrogen gas booster connected to said source of hydrogen gas for receiving and pressurizing said hydrogen gas;
   a nitrogen gas booster connected to said source of nitrogen gas for receiving and pressurizing said nitrogen gas, wherein said hydrogen and nitrogen gas boosters operate independently of one another so that only said hydrogen gas is compressed in said hydrogen gas booster and only said nitrogen gas is compressed in said nitrogen gas booster;
   a hydrogen plenum chamber downstream from said hydrogen gas booster for storing said pressurized hydrogen gas;
   a nitrogen plenum chamber downstream from said nitrogen gas booster for storing said pressurized nitrogen gas;
   a synthesis reactor connected to said hydrogen and nitrogen plenum chambers, said synthesis reactor comprising an inlet for receiving a mixture of said pressurized hydrogen and nitrogen gases, wherein after said hydrogen gas is pressurized by said hydrogen gas booster and said nitrogen gas is pressurized by said nitrogen gas booster, said pressurized hydrogen and nitrogen gasses are combined together for introduction into said synthesis reactor without undergoing further compression,
   a heating zone downstream from said inlet for heating said mixture of said hydrogen and nitrogen gases,
   a catalyst zone downstream from said heating zone for catalyzing a reaction of said mixture of said hydrogen and nitrogen gases to form ammonia and a by-product, and
   a cooling zone downstream from said catalyst zone for cooling said ammonia and said by-product; and
   a separator downstream from said synthesis reactor for separating said ammonia from said by-product, said separator comprising an inlet connected to said synthesis reactor for receiving said ammonia and said by-product, a first outlet connected to an ammonia storage tank for collecting said ammonia, and a second outlet connected to a recycle loop for re-circulating said by-product back to the inlet of said synthesis reactor.

2. The system as claimed in claim 1, further comprising:
   a first storage tank containing said source of hydrogen gas; and
   a second storage tank containing said source of nitrogen gas.

3. The system as claimed in claim 1, wherein said hydrogen plenum chamber comprises a relief valve for maintaining said pressurized hydrogen gas stored therein at about 2,600 psig.

4. The system as claimed in claim 1, wherein said nitrogen plenum comprises a relief valve for maintaining said pressurized nitrogen gas stored therein at about 2,600 psig.

5. The system as claimed in claim 1, wherein said heating zone of said synthesis reactor comprises about the first 12 inches of said ammonia synthesis reactor.

6. The system as claimed in claim 5, wherein said heating zone of said synthesis reactor is covered with an insulating material.

7. The system as claimed in claim 1, wherein said catalyst zone of said synthesis reactor comprises a catalyst including hematite for producing ammonia.

8. The system as claimed in claim 1, wherein said synthesis reactor comprises an outlet and said system further comprises cooling coils in communication with said outlet of said synthesis reactor for cooling a stream of said ammonia gas, and said by-product dispensed from said outlet of said synthesis reactor.

9. The system as claimed in claim 8, wherein said cooling coils condense said ammonia gas into liquid ammonia for storage in an ammonia storage tank.

10. The system as claimed in claim 9, further comprising a recycle loop extending between said outlet of said synthesis reactor and said inlet of said synthesis reactor for returning said by-product back to said synthesis reactor.

11. The system as claimed in claim 1, wherein said synthesis reactor comprises a metal tube having a diameter of about 0.50 inches and a wall thickness of about 0.065 inches.

12. The system as claimed in claim 11, further comprising a thermowell disposed inside said metal tube, said thermowell including thermowell tubing and a thermocouple placed inside said thermowell tubing for measuring temperatures inside said synthesis reactor.

13. The system as claimed in claim 1, wherein said synthesis reactor comprises only one catalyst bed containing a catalyst material located between said inlet and said outlet of said synthesis reactor, and wherein said synthesis reactor has only one heating zone located between said inlet and said outlet of said synthesis reactor.

14. The system as claimed in claim 13, wherein said catalyst material is selected from the group consisting of hermatite, ruthenium, carbon steel iron, titanium, stelite, and platinum or a combination of two or more thereof.

15. The system as claimed in claim 1, wherein said heating zone of said synthesis reactor is separate from said cooling zone of said synthesis reactor, and wherein said catalyst zone of said synthesis reactor is located between said heating zone and said cooling zone.

* * * * *